Patented Aug. 5, 1941

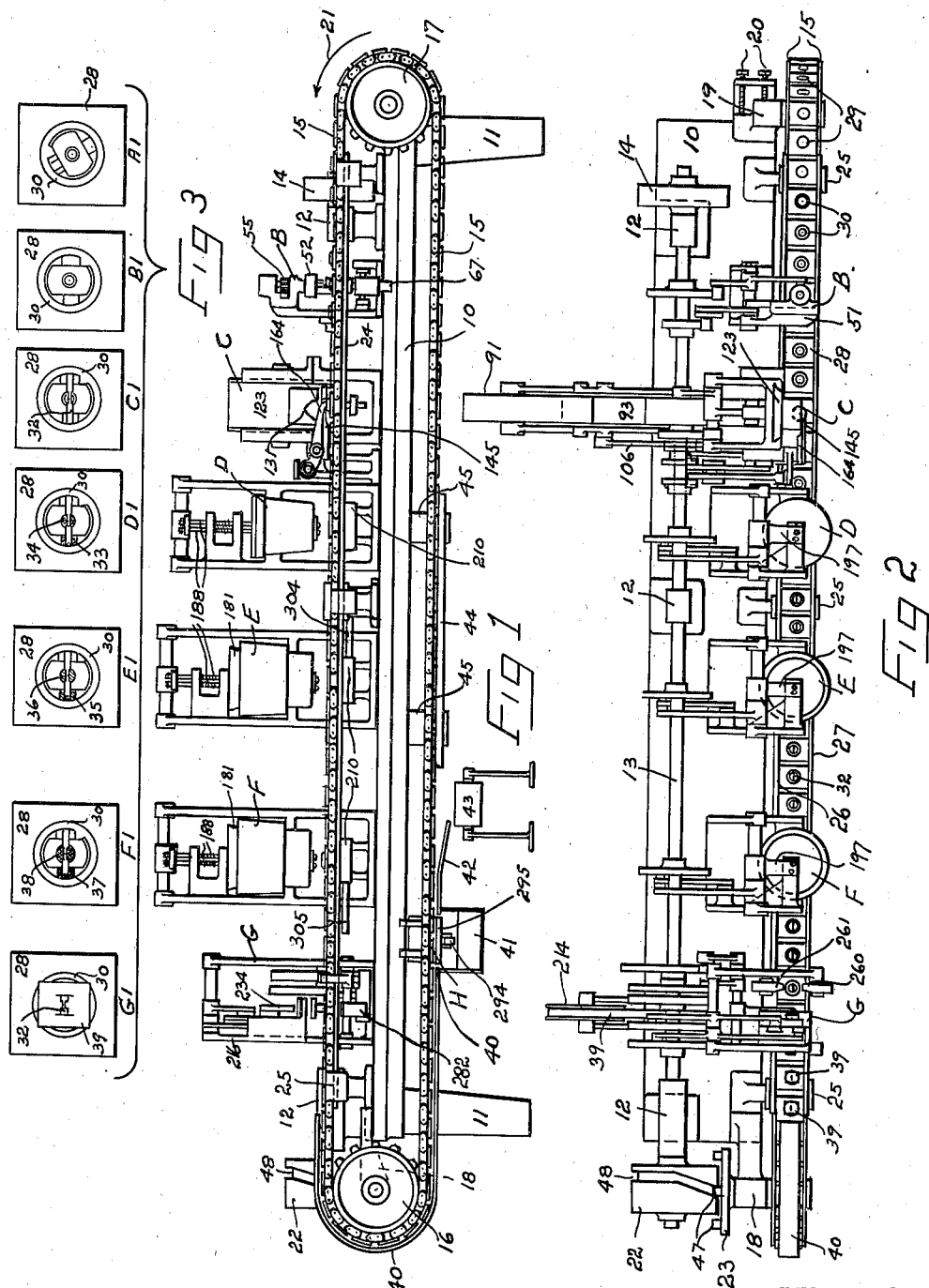
Aug. 5, 1941. L. WEISS ET AL 2,251,434
MACHINE FOR MANUFACTURING ELECTRIC FUSE PLUGS
Filed Aug. 17, 1937 6 Sheets-Sheet 1
INVENTORS.
Leo Weiss,
Louis Ludwig,
BY
ATTORNEY.

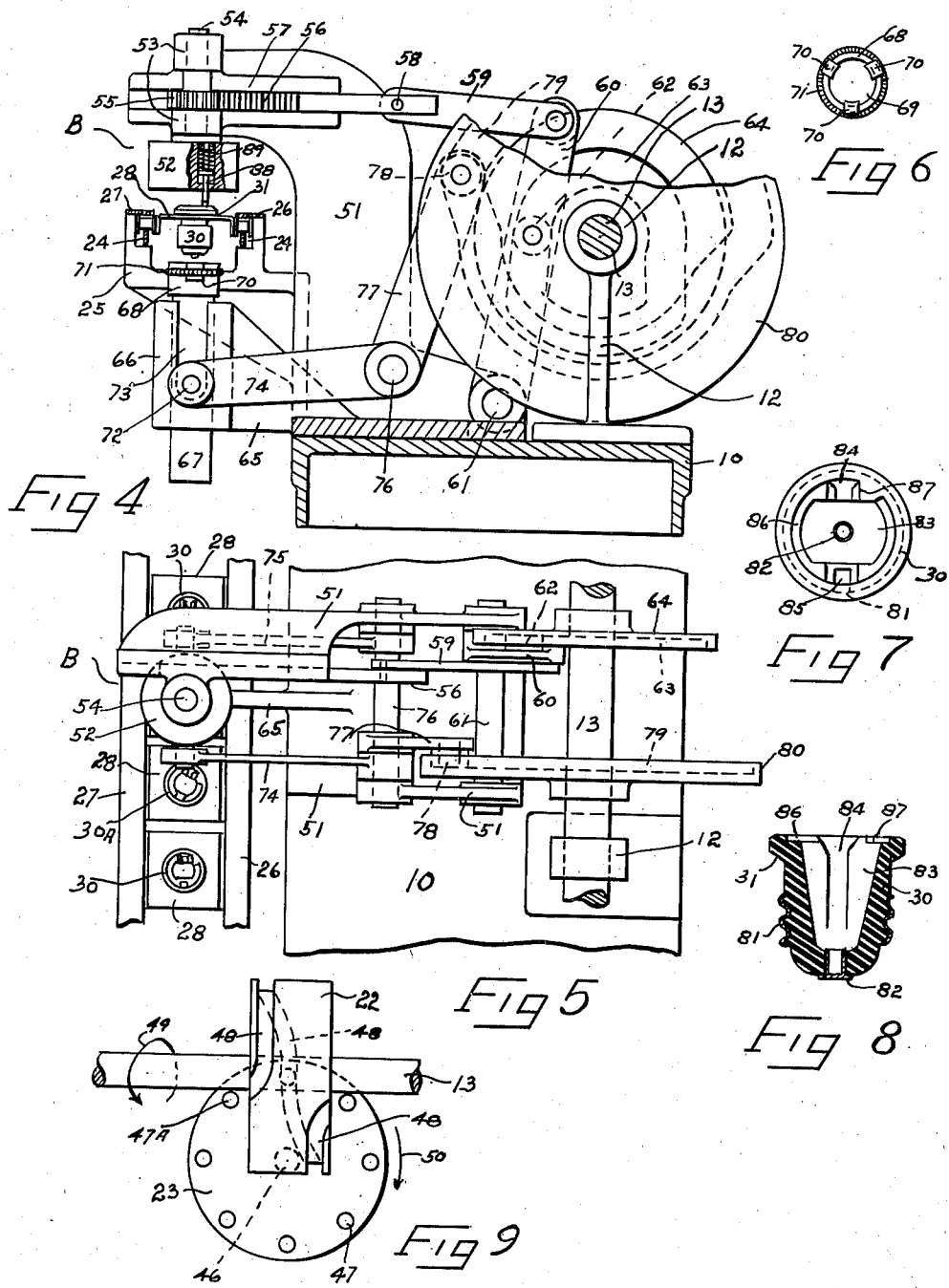

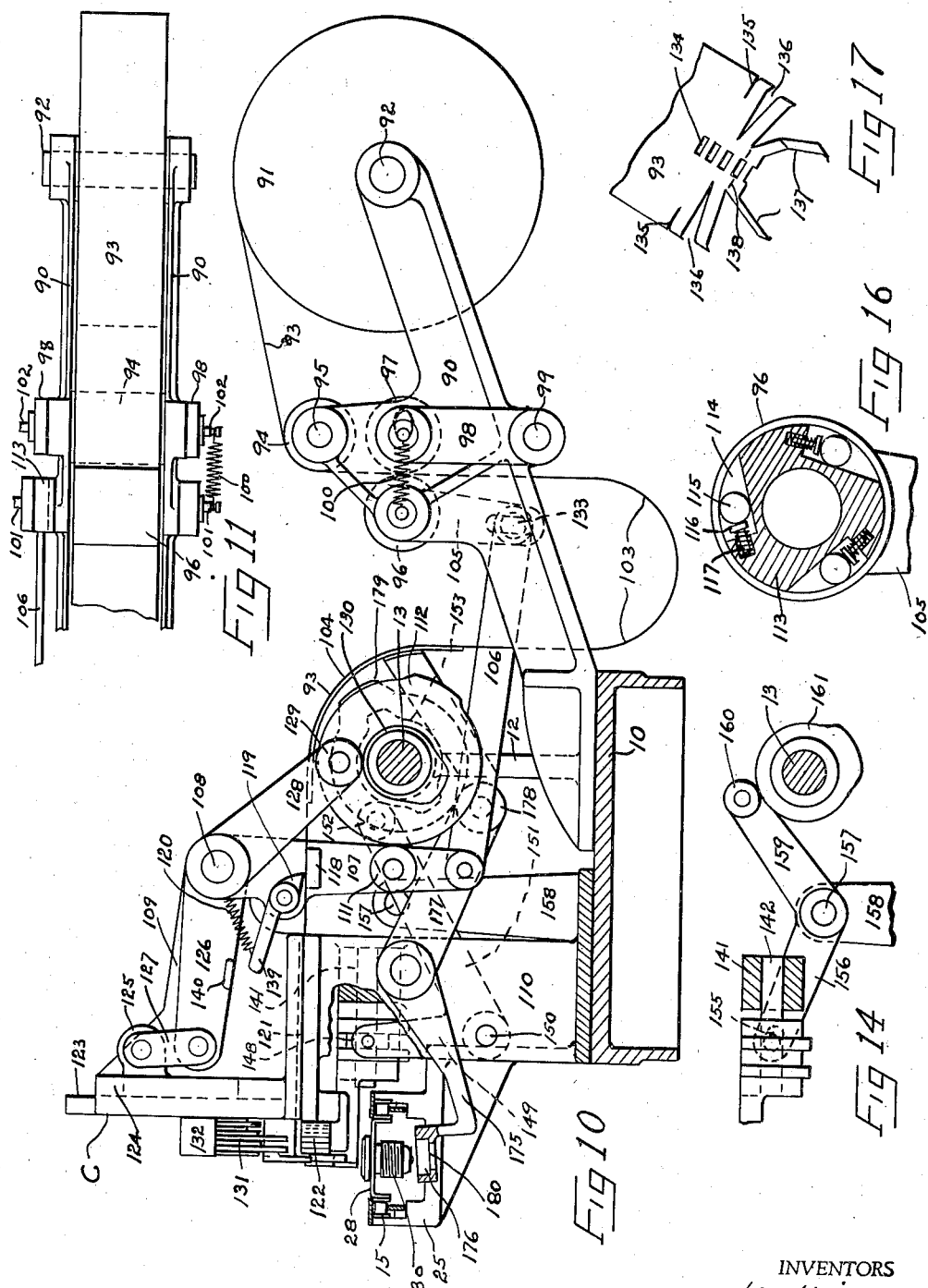

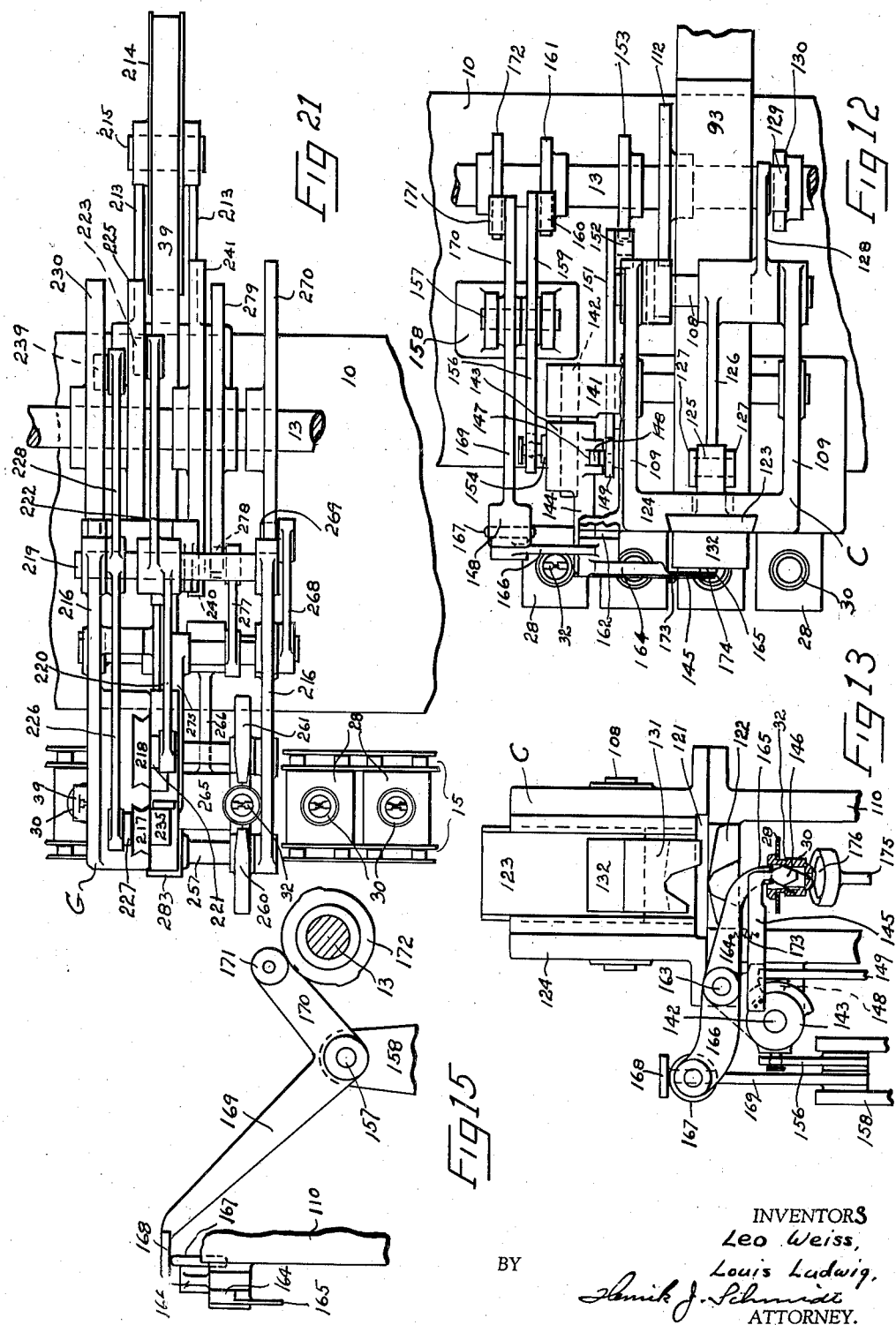

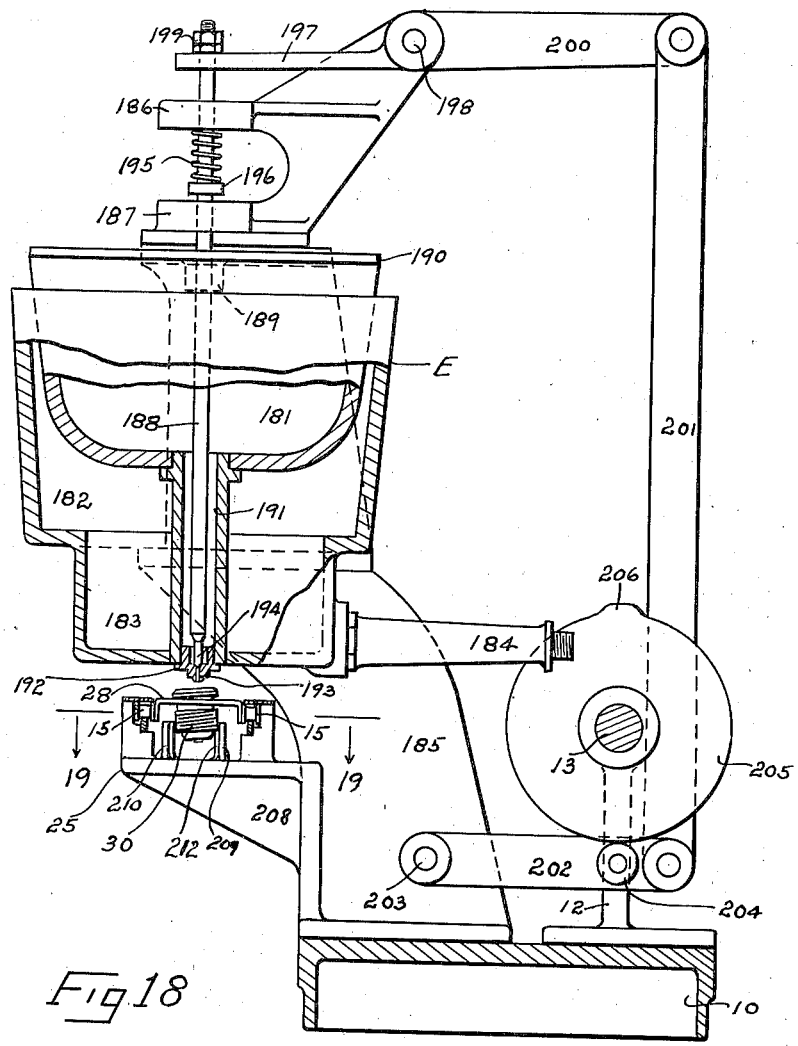
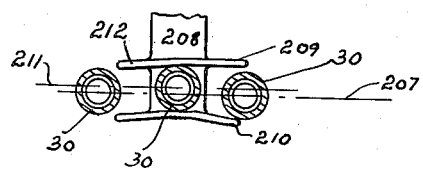

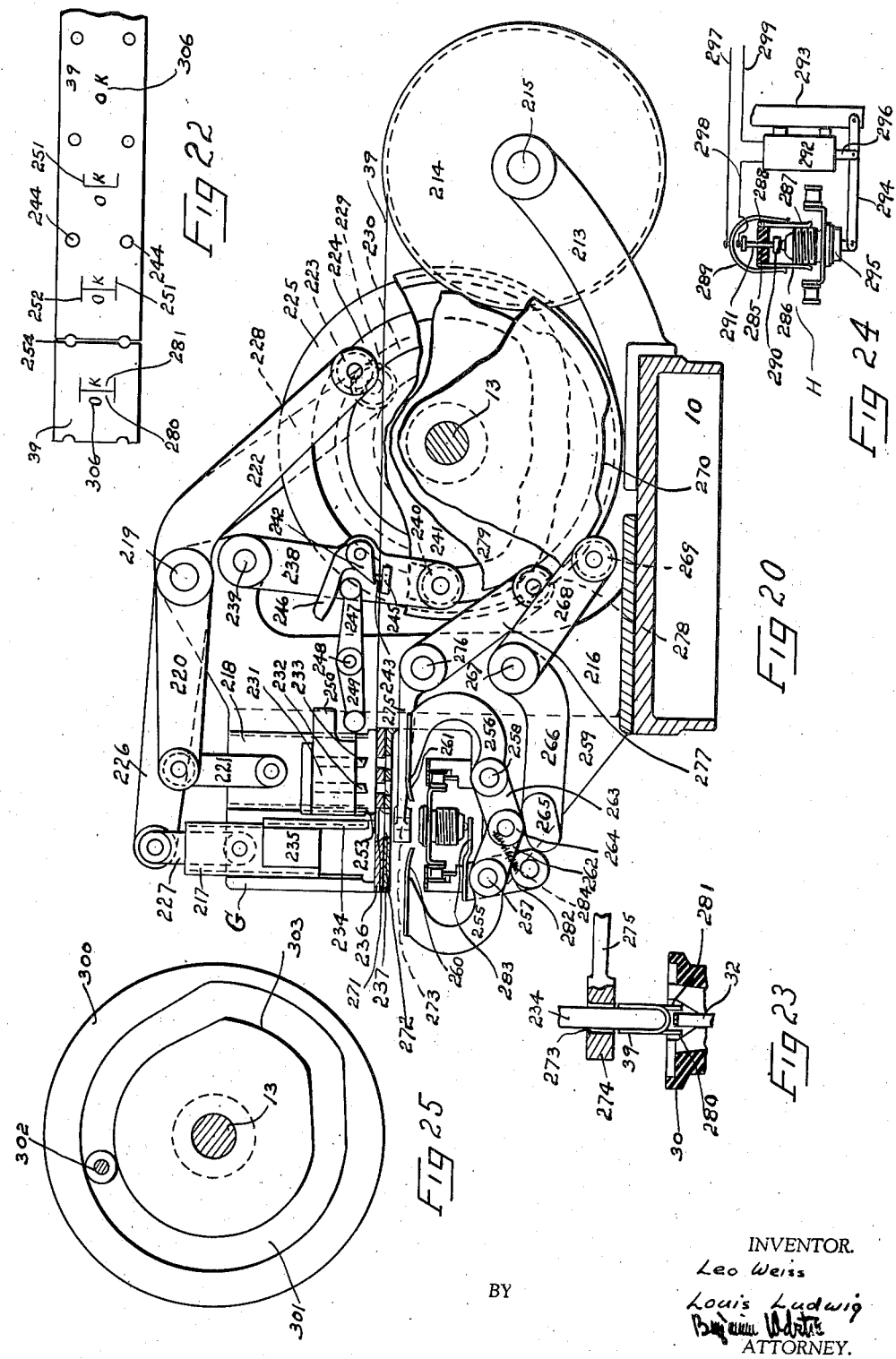

2,251,434

UNITED STATES PATENT OFFICE 2,251,434

MACHINE FOR MANUFACTURING ELECTRIC FUSE PLUGS

Leo Weiss and Louis Ludwig, Brooklyn, N. Y.

Application August 17, 1937, Serial No. 159,468

10 Claims. (Cl. 29—33)

The invention relates to a machine for making and assembling fuse plugs. It has for its main objects to greatly decrease the labor and time ordinarily consumed in making and assembling such fuses; to produce fuses of a superior quality; and to reduce the number of faulty fuses generally found when such fuses are assembled by hand.

The invention comprises in a machine for making fuse plugs a supporting conveyor, means for moving said conveyor step by step, preferably at a uniform rate of speed, and intermittently in the same direction, supports for holding the hollow body members of fuse plugs upright on said conveyor, said body members having attached thereto metal outside contacts and center contacts, means mounted adjacent the conveyor for automatically feeding fuse links towards the conveyor, means mounted near said conveyor for inserting said links in the body members, and means mounted above said conveyor and spaced from said inserting means along the conveyor in the direction of travel of the conveyor, for dropping solder into the body members to solder the ends of the fuse links to the contacts. The invention may also include at the starting end of the conveyor means for rotatively positioning the body members on the conveyor supports, and may include, after the inserting means, means mounted above said conveyor and adjacent said fuse link inserting means for automatically dropping acid into the cavity in the body members to clean the ends of the fuse links and the contacts. Said invention may also include preheating means placed before, and, after the solder-dropping means, means mounted above the conveyor and adjacent the solder-dropping means for dropping cement over said soldered joints, and also means adjacent the conveyor and said cement-dropping means for inserting and flattening slotted labels on the body members to expose the fuse members through said slots, and may include also an electrical device associated with the conveyor and adjacent the label inserting means to test the electrical connections of the fuse plugs and to reject defective fuse plugs. The means in the automatic machine as set forth above, the supports and the devices, are spaced along the conveyor in succession, and are operative within a uniform time interval so that a plurality or all of the essential operations required in fuse-plug manufacture can be automatically performed in proper sequence to produce either incomplete fuse plugs ready for the other operations, or complete fuse plugs.

These plugs produced by this automatic machine are of the type shown in Patent No. 2,073,160, issued March 9, 1937, and Patent No. 2,041,295, issued May 19, 1936.

In the drawings, which illustrate preferred embodiments of a machine for carrying out the method, but in which various modifications might be made without departing from the scope of the appended claims, Fig. 1 is a front elevation of a machine on which the method is performed;

Fig. 2 is a plan view of same;

Fig. 3 is a diagrammatic view illustrating some of the various steps which can be performed on the machine;

Fig. 4 is a side elevation of the locating device shown in part in cross section;

Fig. 5 is a top view of Fig. 4;

Fig. 6 is a top view of a certain chucking device used with the locating device;

Fig. 7 is a top view of a fuse plug body-member of a type which may be assembled in this machine;

Fig. 8 is a cross-sectional, side view of Fig. 7;

Fig. 9 is a rear view of the intermittent-motion mechanism;

Fig. 10 is a side elevation of the fuse link making and inserting machine, shown partly in cross-section;

Fig. 11 is a fragmental, top view of a certain part of this mechanism;

Fig. 12 is another top view of the mechanism;

Fig. 13 is a fragmental, front view of the mechanism;

Fig. 14 is a fragmental, side elevation of one of the movements in this mechanism;

Fig. 15 is another side elevation of another movement in the mechanism;

Fig. 16 is a cross-sectional, side view of a certain member used in connection with the feeding mechanism;

Fig. 17 is a perspective view of a part of the strip of fuse metal from which the fuse links are made and showing various steps in the making of this fuse link;

Fig. 18 is a side view of the soldering device, shown partly in cross section;

Fig. 19 is a top view of the fuse-tilting device which is used in connection with the soldering, as well as with some of the other devices;

Fig. 20 is a side elevation of the label cutting and attaching device, shown partly in cross-section and with certain parts broken away;

Fig. 21 is a top view of Fig. 20;

Fig. 22 is a plan view of a strip of labels, such as are used with the fuses;

Fig. 23 is a fragmental view of some of the parts of the label-attaching device;

Fig. 24 is a side view of the fuse testing device; and

Fig. 25 is a side view illustrating one of the grooved cams employed in the device.

Referring first to Figs. 1 and 2, the machine consists of a table 10 which is supported at each end on legs 11. A plurality of pedestal bearings 12 are mounted on top of the table and in these bearings a main shaft 13 is rotatingly mounted; power being imparted to this shaft by pulley 14, or by any other suitable means. A double chain 15 is mounted on sprocket wheels 16 and 17 which are in turn mounted in bearings 18 and 19. The bearing 19 is preferably slidably mounted by means of adjusting screws 20 so that the chains may be tightened as wear occurs. The chains are driven in the direction indicated by the arrow 21 and intermittent motion is imparted to the chains by means of a grooved cam 22, mounted on the end of the main shaft, and a studded disk 23, secured on the same shaft on which the sprockets 16 are secured. This intermittent-motion mechanism will be described later.

The upper part of the chain is supported on rails 24 mounted in brackets 25. These brackets are secured on top of the table 10. A pair of upper guides 26 and 27 are also secured on the brackets 25, as plainly shown in Fig. 4. The two chains 15 are connected by a plurality of square links 28 in each of which a circular opening 29 is formed. The fuse bodies 30, on which the process is to be performed, are inserted in these openings so that they will hang between the two chains and be supported by the upper shoulder 31 of the fuse, as plainly shown in Fig. 4.

The fuses are inserted in these openings at the right-hand end of the machine and, as the main shaft keeps turning continuously, the intermittent-motion mechanism moves the chains a step at a time, equal to the length of the distance between two adjacent fuses. The fuses may be inserted in the links without regards for their exact location, as shown at A1 in Fig. 3. As the fuse bodies advance towards the left, they are progressively brought in underneath a locating device B, which turns the fuse body to the correct position, as indicated in B1 in Fig. 3. This device will be described in detail later, as will also the other devices now to be mentioned.

Next the fuse body is moved under the fuse link making and inserting device C, which inserts the link 32, as shown in C1. The fuse body is next brought under the acid pot D where small quantities of acid, as shown at 33 and 34 in D1, are dropped into the fuse body to clean the ends of the fusible link and the parts with which they contact.

The fuses are next advanced under the solder pot E where quantities of solder 35 and 36 are dropped on the ends of the link, as shown in E1. Next the fuse link is placed under the pot F, containing porcelain cement or other sealing medium with which the joints are finally sealed, and small quantities of this medium are dropped into the fuse, as shown at 37 and 38 in Fig. 1. After this the fuse body is brought under the label-cutting and inserting device G where a label 39 is secured to the fuse, as shown in G1. The fuse is now carried around to the left-hand end of the chain while held in position by means of a guard 40 which extends around the end of the chains and under same.

An electric testing device H is placed at the end of the guard and as the fuses pass through this device they are tested to ascertain whether the proper electric connections are made. Faulty fuses are discharged from the testing device into a shute 41, while perfect fuses are carried through the device and along over another guide 42 from which are discharged to a conveyor 43. To prevent the lower part of the chains from sagging, a rail 44 is placed under the chains and this rail is supported from the table by means of brackets 45.

The operation of the machine will now be described in detail. As previously said, the fuse bodies are placed in the sockets 29 at the right-hand end of the machine and advanced, step by step, by an intermittent-motion device. This device is shown in Figs. 1 and 2, but is more fully illustrated in Fig. 9. It consists of the grooved cam 22 and the disk 23 which is mounted on a shaft 46 on which the set of sprocket wheels 16 is mounted. The disk is provided with a plurality of studs 47 on its face, while the cam is provided with a groove 48, shaped as indicated in Fig. 9.

As the main shaft turns in the direction indicated by the arrow 49, the stud, which is engaged in the groove, causes the disk 23 to move in the direction indicated by the arrow 50 so that the stud marked 47A will enter the groove adjacent to it, while another stud will be discharged from the groove. Thus, an intermittent movement is transmitted to the chain and each movement is of such a length as to move the chain a predetermined distance and place the fuse bodies exactly under the various devices on the machine.

The fuse body after having been inserted in the socket in the chain, is passed under the locating device which is illustrated in Figs. 4, 5 and 6 and which will now be described. This device consists of a frame member 51 which is mounted on the table 10 and in the upper part of which a rotating member 52 is mounted in bearings 53 by means of a vertical shaft 54. A gear 55 is rigidly mounted on the shaft 54 and this gear is actuated by a rack 56 which slides in a grooved bearing 57. The end of this rack is pivoted, at 58, to a link 59 which in turn is pivoted to a lever 60 mounted on a shaft 61 which is supported in bearings formed on the frame structure 51. The lever 60 is provided with a roller 62 which engages in a cam groove 63 milled in the cam 64. This cam is secured on the main shaft 13 as are all the other cams employed in the machine. One of these grooved cams is shown in Fig. 25; the shapes of the grooves being such as to give the proper action and timing to the parts which the cams actuate.

A bracket 65 is made integrally with the frame structure 51 and extends outwardly from the table, between the upper and lower parts of the chain. At the outer end of this bracket, a vertical bearing 66 is formed and in this bearing a plunger 67 is mounted. The plunger has an enlargement 68 at its upper end and in this enlargement a socket 69 is formed. This enlargement and socket is best illustrated in Fig. 6. Three jaws 70 are slidingly mounted in grooves cut in the upper part of the enlargement and are held in place by a coil spring 71, as plainly shown. This spring tends to push them inward in the socket. The plunger 67 has a shaft 72 secured transversely through it and this shaft is adapted to slide in grooves 73 formed in the bearing 66. The ends of the shaft 72 are connected to two levers 74 and 75 which in turn are pinned to a shaft 76. Another lever 77 is pinned to this shaft and provided with a roller 78 at its upper end. This roller engages in a cam groove 79 formed in a cam 80. A part of this cam, which is also mounted on the main shaft 13, has been broken away so as to better illustrate the cam 64 and parts operated by this cam.

Before describing the operation of the locating device, one embodiment of a fuse body member, such as may be used on this machine, will now be described. This fuse body member is shown in detail in Figs. 7 and 8. It consists of the insulating body member 30, on which a threaded, metal contact 81 is secured in the customary manner, as is also a hollow rivet 82. This hollow rivet and the threaded metal shell form the two electric contacts of the fuse when finished. A recess 83 is formed in the body member and shaped as plainly shown in the two views. A groove 84 is formed in one side of the recess, while a pocket 85 is formed on the other side. This pocket extends clear through to the exterior of the body members so that the threaded metal shell may be seen through the pocket. A depression 86 is formed in the upper face of the body member and extends practically all the way around the upper face, except for a short distance where the material of the body member comes up even to the top of the fuse. This point is shown at 87.

As previously stated, the body members are inserted in the sockets in the links of the chain. While some of them may be inserted properly, others will be improperly inserted, as for example the fuse shown at 30A in Fig. 5. The object of the locating device is to turn this body member into the correct position before it enters under the other device of the machine. This is accomplished in the following manner: When the fuse enters directly under the locating device, the plunger 67 is lifted, through the instrumentality of the cam 80, lever 77 and levers 74 and 75, so that the body member will be forced into the socket 69 and held with slight friction between the jaws 70. The fuse is prevented from upward movement by the rotary member 52. The plunger 88 is urged downward by a spring 89. The position of the plunger is such that it will engage in the depression 86 of the body member. When the cam 64 is now rotated, the rotating member 52 will be turned, through the instrumentality of the gear 55, rack 56, link 59, lever 60, and cam 64, so that the plunger will turn around in the recess until it encounters the raised part 87. This movement of the rotating member 52 is so arranged, by the construction of the cam 64, that it will align the body member exactly in the right position in the chain. While the plunger 88 is moved around in the recess 86, the body member is prevented from turning by the friction exerted on it by the jaws 70. After the body member has been located correctly the parts are returned, by the cams, to their inactive positions and stay in these positions until the next body member is to be acted upon.

Referring now to Figs. 10 to 17, inclusive, the fuse link making and inserting device will now be described in detail. A frame structure 90 is secured to the table 10 and extends rearwardly therefrom. On the outer end of this frame structure a roll 91, of fusible metal is mounted on a short shaft 92. The strip of metal 93 is carried over a roller 94 mounted on a shaft 95 in the frame structure. From this roller it is carried down between two rollers 96 and 97. The roller 96 is mounted in the frame structure 90 while the roller 97 is mounted for oscillatory movement on two levers 98, pivoted on a shaft 99, which is mounted on the frame structure 90. The rollers are held in close contact with each other by means of tension springs 100 mounted on pins 101 and 102, inserted, respectively, in the ends of the shafts supporting the rollers 96 and 97. The rollers 96 and 97 may be geared together and their object is to smooth the fusible metal strip and remove any irregularities which it may contain. The fusible metal strip is allowed to form a deep loop, as shown at 103. It is then carried upward over a guide 104 from where it is carried to the punch and die, which will be described later.

The roller 96 is actuated by a lever 105, which is connected to a link 106, which in turn is connected to a lever 107 which is rigidly secured to a shaft 108 mounted on an upper frame structure 109. This upper frame member is mounted on a lower frame structure 110 secured on top of the table 10. A roller 111 is mounted on the lever 107 and engages on a cam 112 mounted on the main shaft 13. As this cam rotates, the arm 107 will be rocked and through the link 106 will impart a rocking motion to the lever 105, which is connected to the roller 96 by means of the device shown in Fig. 16. This device will now be described.

The lever 105 is directly connected to a sleeve 113 which is free to rotate on the end of the roller 96. A plurality of angular cuts 114 (see Fig. 16) are formed in the ends of the sleeves, in opposite directions, and in these cuts balls 115 are placed. Each ball is engaged by a plunger 116 which is actuated by a compression spring 117. Thus the plunger tends to wedge the balls against the sleeve 113 and roller 96. It will be noted that this movement acts somewhat similar to a ratchet in that it will cause the roller to move when the sleeve is turned in one direction and causes the balls to slip, and thus not move the roller, when turned in the opposite direction. The sleeves 113 alternately wedge in one direction and slip in the other direction of the oscillation.

The fuse-metal strip 93 passes over a lug 118, formed integrally with the lever 107, and under a feeding pawl 119, which is held in contact with the metal by means of a spring 120. The fusible metal strip is next passed through an opening 121 between the upper and lower frame members 109 and 110 and is finally engaged over the die member 122.

A ram 123 is slidingly mounted in a dovetailed groove formed in a vertical member 124 cast integrally with the upper frame member 109. A lug 125 extends rearwardly from the ram 123 through a slot formed in the part 124. This lug is connected to one arm 126 of a bell crank by means of links 127. The other arm 128 of this bell crank is provided with a roller 129 at its outer end which engages on a cam 130 mounted on a main shaft. As this cam turns, an upward and downward movement is imparted to the ram through the instrumentality of the bell crank and the links 127. The die 122 is secured to the lower frame member 110, while the gang punch 131 is secured to a lug 132 which is fastened to the ram 123. The connection between the levers 105 and 106 is preferably made adjustable, as indicated at 133, so as to feed an exact amount of the fusible metal strip.

Fig. 17 shows the manner in which the gang die operates. The metal strip is shown at 93. The first step is to pierce an opening 134, next a slight sheared operation is performed on each side of the metal as indicated at 135. After this the metal is sheared and the ends bent slightly over, as shown at 136, after which the metal is bent to the shape indicated at 137. It is finally severed by a cut off punch on the line indicated at 138. All these operations are done simultaneously, so that in each descent of the punch a complete link is made and formed.

The various parts of the gang punch and die are plainly shown in 131 and 122 and inasmuch as the construction of such gang tools are well known in the art, it is not thought necessary to describe these parts in detail. The rollers 96 and 97 draw the metal from the roll 91 and, as previously said, straightens the metal. The actual feeding is performed by the feeding pawl 119 and the lug 118. After the punch has engaged in the metal, a tail 139 formed on the feeding pawl is engaged by a lug 140 formed on the lever 126. This lug lifts the tip of the feeding pawl and disengages it from the metal strip. In the meantime, while the punches are still engaged in the metal, the arm 107 rocks rearwardly and engages further back under the metal strip 93. As the lever 126 is again lifted up, the lug 140 disengages the tail 139 and allows the pawl 119 to engage with the metal strip. As the pawl 129 now swings forward, and as the punches have been disengaged from the metal strip, the strip is carried forward the exact amount for the next operation of the punch.

The manner in which the fuse link is inserted in the fuse will now be described and this is best illustrated in Figs. 12, 13, 14 and 15. A bracket 141 is formed on one side of the lower frame structure 110 and from this bracket a shaft 142 extends forwardly. A sleeve 143 is slidingly mounted on the shaft and provided with a forwardly extending member 144 on the end of which the fuse link supporting arm 145 is mounted. This arm is made of a very thin strip of metal, as shown in Fig. 12, but has on its extreme end a projection 146 which is shaped to conform to the shape that the link will have when inserted in the fuse. It extends rearwardly, looking at Fig. 13, so as to fit into the link and is of the shape plainly shown in Fig. 13. A groove 147 is formed on one side of the sleeve 143 and in this groove a shoe 148 is slidingly mounted on one arm 149 of a bell crank. A side view of this bell crank is shown in Fig. 10 while a top view is shown in Fig. 12. The bell crank is pivoted on a shaft 150 mounted in a bearing on the frame structure 110, while the other arm 151 of the bell crank is provided with a roller 152 at its outer end. This roller engages on a cam 153. The cam is so constructed that it will impart inwardly and outwardly sliding movements of the sleeve 143 for each revolution of the main shaft.

A stud 154 is secured on the other side of the sleeve, substantially oposite the groove 147, and this stud is engaged in a slot 155 formed in one arm 156 of a bell crank, which is pivoted on a shaft 157 mounted in a bearing 158 supported on the table. These parts are plainly illustrated in Figs. 12, 13 and 14. In Fig. 10 these parts have been omitted to simplify the view, except for the bearing 158 which has been shown in this view so as to indicate its position in relation to the other parts of the machine. The other arm 159 of the bell crank carries a roller 160 at its outer end and this roller is engaged against a cam 161 mounted on the main shaft 13.

It will be seen that as the cam 161 rotates, the sleeve 143 will be turned on the shaft 142 and that consequently the fuse link supporting arm 145 wil be moved into and out of the fuse, as plainly illustrated in Fig. 13. A boss 162 is formed on the front of sleeve 143 and on this a double armed lever is mounted on a shaft 163. One arm 164 of this lever is curved, as shown, and made very thin at its extreme end 165. This thin end passes behind the fuse link suporting arm 145 and engages on top of the link when the link is supported on the member 146. This will be explained more fully later. The other arm 166 of this lever is provided with a roller 167 which is engaged by a flat member 168 formed on one arm 169 of a bell crank which is also pivoted on the shaft 157 supported in the bearing 158. The other arm 170 of this bell crank is provided at its outer end with a roller 171 which engages on a cam 172 mounted on the main shaft. It will be seen that as the cam 172 turns the end 165 will be lifted so as to engage with, or disengage from, the fuse link supported on the member 146. A tension spring 173 tends to hold the arm 164 and the fuse link supporting member 145 together.

The link inserting mechanism just described is timed and functions in the following manner: Just before the punches 131 descend so as to sever a link from the strip of fuse metal, the links supporting member 146 is swung up in position so as to be inside of the link just before it is severed, while the end 165 of the arm 164 is disengaged from the link but slightly above it. The cut off punch occupies and passes through the narrow space shown at 174 in Fig. 12. As the link is severed the end 165 of the arm 164 engages on top of the link and this arm, as well as the fuse link supporting arm 145, moves downward with the link and forces this into the fuse, causing the link, owing to the groove 84 and the pocket 85 in the interior of the fuse, to assume the shape plainly shown in Fig. 13 and to cause the ends of the link to engage with the threaded metal shell 81 and the hollow rivet 82. After the link has been inserted in the fuse the end 165 of the arm 164 disengages from the top of the link and the fuse link supporting lever 145 is moved forward by the action of the cam 153 which, through the instrumentality of the bell crank arms 149 and 151, and the shoe 148, which engages in the groove 147, causes the sleeve 143 to slide on the shaft 142. The parts are now moved up again to receive the next link to be severed.

In Fig. 10, a bell crank consists of an arm 175 which is provided with a circular socket 176 at its outer end. The other arm 177 of the bell crank is provided with a roller 178 at its outer end and this roller engages against a cam 179 mounted on the main shaft. As the cam 179 rotates the bell crank is rocked so that the fuse will engage in the socket 176 and be supported by the shoulder 180 formed in this socket. This action raises the fuse slightly from the chain and supports it effectively while the link is forced into place.

After the fusible link has been inserted in the body member, as just described, the fuse is advanced another step underneath the acid pot D. While under this pot, two small quantities of acid are dropped into the recess in the fuse body and these are so directed that one drop will cover one end of the fusible link and the part of the metal shell with which it is in contact, while the other drop of acid will cover the other end of the fusible link as well as the part of the hollow rivet with which it is in contact. This is done to clean the parts prior to soldering.

Inasmuch as the acid pot is similar in all respects to the solder pot, except that no means are provided for heating it as in the case of the soldering pot, it is not thought necessary to describe it in detail. Its construction will be readily understood from the description of the solder pot. This solder pot is shown in Fig. 18, and it consists of solder container 181 which is supported inside of another container 182 in the lower part of which a combustion chamber 183 is formed. The solder may be kept hot by any suitable means, as for example, gas, as shown by the gas inlet pipe 184. The container 182 is supported on a frame structure 185 and on the upper part of this frame structure, two bearings 186 and 187 are formed. Two rods 188 are slidingly mounted in these bearings and extend down through bearings 189, formed in the cover 190 of the solder pot, and down through the solder pot. Only one of these rods is shown in Fig. 18, but the two of them are plainly shown in Figs. 1 and 2.

A sleeve 191 extends downwardly from the solder pot and concentrically through the combustion chamber 183. A plug 192 is inserted in the lower end of this sleeve and in this plug two small orifices 193 are formed. Normally these orifices are closed by the pointed ends 194 of the rods 188 by means of compression springs 195 which abut against a collar 196, secured on the rod, and the bearing 186.

The rods 188 are actuated by a lever 197, 200 which is rotatably secured on a shaft 198 supported in the frame 185. The rods are connected to one end of the lever 197, 200 by means of adjusting screws 199. The other end of the lever 197, 200 is connected, by means of a link 201, to still another lever 202 pivoted on a shaft 203 which is mounted in the lower part of the frame structure 185. A roller 204 is mounted on the lever 202 and engages against a cam 205 which is mounted on the main shaft 13. It will be seen that for each turn of the main shaft the link 202 will be depressed by the actuating part 206 on the cam. This causes the lever 197 to be lifted and this consequently lifts the rods 188 so as to cause two small quantities of the solder, from the heated solder pot, to flow through the orifices 193.

However, before the fuse member enters under the solder pot, as well as before it enters under the acid pot, it is advisable that it be slightly tilted so that the acid or solder may be dropped at just the right points. This tilting is accomplished by a device of which the side view is shown in Fig. 18 and the top view in Fig. 19. In Fig. 19 the regular center line of the travel of the fuse is shown at 207. The tilting device consists of a bracket 208 which is secured to the table 10. On the outer end of this bracket two upwardly extending members 209 and 210 are formed. As the fuse travels along on the center line 207, its lower part encounters the member 210 and is caused to tilt as plainly shown in Fig. 18. This causes the bottom of the fuse to travel on the center line indicated at 211 in Fig. 19. After the solder or acid has been dropped into the fuse and the fuse is again advanced, the lower part of the fuse is engaged by a part 212 which again straightens the fuse member to its normal position. This is performed both under the acid pot and the solder pot, as well as under the pot F in which heated sealing cement, or any other suitable sealing medium, is contained. Inasmuch as the construction of the pot F is exactly like the solder pot just described, it will not be necessary to further describe this pot.

The next step is to attach the label 39 and refernce is now made to Figs. 20 to 23, inclusive, in which the label attaching device is shown. A bracket 213 is attached to the top of the table 10 and extended rearwardly therefrom. In this bracket a reel 214 is mounted on a shaft 215 and the strip of labels 39 is wound on this reel and fed to a set of punches which we now will describe. A frame structure 216 is secured to the front end of the table and in the upper end of this frame structure two rams 217 and 218 are slidingly mounted. A bell crank is mounted on a shaft 219 and one arm 220 of this bell crank is connected to the ram 218 by means of a link 221. The other arm 222 of this bell crank is provided with a roller 223 which engages in a groove 224 in the cam 225. As the cam turns, a reciprocating motion is imparted to the ram 218.

Another bell crank is mounted on the shaft 219 and has one of its arms 226 connected to the ram 217, by means of a link 227. The other arm 228 of this bell crank is provided with a roller 229 which engages in the groove in a cam 230 secured on the main shaft. As this cam rotates the ram 217 will be reciprocated. A punch holder 231 is secured to the ram 218 and in this punch holder, punches 232 and 233 are secured. A forming punch 234 is secured to a holder 235 which is secured on the ram 217. A die 236 is secured under the punches and supported on a member 237 of the frame structure 216.

The strip of labels 39 is fed to the punches by the following mechanism. An arm 238 is pivoted on a shaft 239 which is supported in the frame 216. The lower end of the lever is provided with a roller 240 which engages in the groove in a cam 241. A feed pawl 242 is pivoted on the arm 238 and this pawl is provided with two pins 243 which engage in holes 244 punched, at regular intervals, in the strip of labels as shown in Fig. 22. A lug 245 is formed integrally with the arm 238 and extends in under the strip of labels, as plainly shown in Fig. 20. This lug is provided with holes which align with the pins 243. The pawl 242 is also provided with an arcuated tail 246 against which one arm 247 of a lever pivoted on the frame by stud 248. The other arm 249 of this lever is engaged by an extension 250 formed on the punch holder 231.

It will be seen that as the ram descends the extension 250 will engage with the arm 249 and depress this arm. This causes the arm 247 to engage with the tail 246 and consequently lifts the pins 243 out of the holes in the label. As the cam 241 now turns the lever 238 is moved rearwardly and, as the pins 243 encounter the next sets of holes 244 in the strip of labels, the pins will enter these holes so that, when the lever 238 is again moved forward by the cam, the label strip will be fed forward an amount equal to the length of one label. As the ram 218 descends, the punch 233 forms a U-shaped cut in the label as shown at 251, while the punch 232 makes another but oppositely-disposed, U-shaped cut 252, thereby forming what may be called an I-shaped slit in the label. The cut-off punch 253 severs the label from the strip as indicated at 254.

Prior to advancing the fuse body under the label attaching device we preferably employ another aligning device to make sure that the fuse is still correctly located and with the fusible link 32 pointing in the right direction. This locating device, which is plainly shown in Figs. 20 and 21, consists of two arms 255 and 256 which are mounted on shafts 257 and 258 supported in forwardly extending brackets 259 formed on the frame structure 216. The arms are curved, as plainly shown in Fig. 20, so that they will pass around the chain and chain guides and they are provided, at the upper ends, with two narrow metal plates 260 and 261 which are adapted to enter in the recess of the fuse and engaged on opposite sides of the fusible link, thus turning the fuse if it should have been misplaced. The location of the fuse link is plainly shown in Fig. 23. The arms 255 and 256 are actuated by the following mechanism. A lever 262 which is an extension of arm 255 and another lever 263 which is an extension of arm 256, and the ends of these levers are preferably provided with rollers 264 and are engaged by a transverse member 265 formed on the outer end of a lever 266. To show these parts more plainly, a part of the chain links have been removed in Fig. 21. The lever 266 is secured on a shaft 267 on which another lever 268 is also secured. This lever 268 is provided with a roller 269 at its outer end which engages against a cam 270, secured, like all the other cams, on the main shaft 13. It will be seen that as the cam rotates the arm 266 will drop and thus cause the members 260 and 261 to enter the recess in the fuse body and engage with the opposite sides of the fusible link; thus properly aligning the whole fuse.

The attachment of the label to the fuse will now be explained. After the label has been severed by the punch 253, it drops into a square recess 271 formed in the die 236 and as the forming punch 234 descends it engages the label right over the center of the I-shaped slit. By forcing the label through a narrower opening 272, located below the recess 271, it is bent around the forming punch. The forming punch next forces the label through a rectangular opening 273 formed in an enlargement 274 on the end of a lever 275. The front end of this lever is plainly shown in Fig. 23. The lever 275 is secured to a shaft 276, supported in the frame structure 216. Another lever 277 is also secured to the shaft 276 and provided with a roller 278 at its outer end. This roller engages on the cam 279.

Referring now particularly to Fig. 23. The forming punch 234 forces the label 39 completely through the opening 273 in the end of the lever 275. This causes the I-shaped slit to open and to form two tongues 280 and 281 which straddle the fusible link 32, as plainly shown. The lever 275 next rises and releases the label 39 and when descending flattens out the label on top of the fuse as the forming punch 234 again ascends. Thus the lower face of the outer end 274, of the lever 275, will engage with the upper face of the label 39 and flatten it out against the face of the fuse, but with the tongues 280 and 281 turned from the position shown in Fig. 23 underneath the fusible link 32.

To hold the fuse link 32 in position while the label is being attached, the instrumentality now to be described is employed. It consists of an arm 282 which is rotating mounted on the shaft 257. On the upper end of this arm a fuse contact member 283 is secured. This contact member engages with the bottom of the fuse body and lifts it some short distance above the chain, while the label is being inserted. The movement which causes the arm 283 to lift the fuse is imparted by a spring 284 which causes the arm 283 to ride up on the member 265 when this member is dropped down by the action of the cam 270.

The label is now tightly secured to the fuse body by the manner in which the tongues 280 and 281 are held underneath the fusible link. As the chain moves, the fuses are carried underneath the guide 40, which is plainly shown in Figs. 1 and 2 at the left-hand of the machine. This inverts the fuse so that it now rides upside down on the lower part of the chain.

The next step is to carry the fuse to the testing device H which is illustrated in Figs. 24 and 1. This testing device consists of a relatively long strip of insulating material, such as fiber 285, on the opposite sides of this strip downwardly-extending metal plates 286 and 287 are secured. One of these plates, as for example the plate 287, is hinged to the insulating strip 285, as indicated at 288. The plate 287 is held tightly against the fuse by means of a couple of springs 289, shaped as plainly shown in Fig. 24. As the fuses are carried between the plates 286 and 287, these plates contact with the threaded, metal shell of the fuse.

A metal bar 290 is mounted on pins 291 which are slidingly mounted in the insulating strip 285. This bar contacts with the center contact of the fuse. A solenoid 292 is secured to a bracket 293, by means of which the whole testing device is secured to the table, and a lever 294 is pivotly mounted to the bracket. The other end of this lever supports an elongated platform 295 over which the fuses must pass. The core 296 of the solenoid is pivotly connected to the lever 294. A wire 297 connects a source of electricity with the spring 289, another wire 298, connects the bar 290 with the solenoid, while a wire 299 connects the solenoid with the source of electricity.

The testing device works in the following manner. The fuses, after leaving the guide 40, are carried over to the platform 295 and as previously said, in between the metal strips 286 and 287. If the electric connections have been correctly made in the fuse, the current will flow through the wire 297, spring 289, metal strips 286 and 287 into the threaded metal shell of the fuse, then through the fuse link and out through the center contact, from whence it will flow through the bar 290, pins 291, wire 298, solenoid 292, and through the wire 299, back to the original source. Properly connected fuses are thus carried over the platform to another guide 42, from which they are discharged to a conveyor 43. However, if the fuse is incorrectly connected, no current will flow through the fuse, nor through the solenoid, thus causing the lever 294 to be dropped together with the platform 295. This causes any faulty fuse to be discharged into the shute 41.

While some of the cams employed are of the disc type in which the roller engages on the periphery of the cam, others are of the groove, or box, type shown in Fig. 25, where the cam proper is shown at 300. As is well known, no motion is imparted to the lever, on which the roller 302 is connected, while the roller is contained in the circumferential part of the groove, but only when it passes through the raise 303. In none of the cams shown in the machine, whether of the disc or groove type, has any attempt been made to show correct timing, as this would have greatly complicated the various views. However, the design and timing of such cams are so well known in the art that anyone, connected therewith, would readily be able to design and time such.

Under some circumstances, it may be advisable to preheat the fuse bodies before they are placed under the soldering pot. When this is found necessary, a perforated gas pipe, such as shown in 304 in Fig. 1, is employed. This pipe is located underneath the chain and imparts a certain amount of heat to the fuse bodies. When the fuse bodies are heated in this manner, it is sometimes also advisable to again cool them after the fusible link has been cemented in place. This may be accomplished by means of a perforated pipe, such as shown at 305 in Fig. 1, through which cool air is forced.

While we have shown a specific type of fuse, known in the trade as the "O. K." fuse from the emblem 306 imprinted on the label, it is evident that fuses of many other types and various construction may be handled on this machine. It will further be understood that the machine is shown particularly to facilitate the description of the method employed.

Having described the invention and its objects, what we claim as new and wish to protect by Letters Patent is:

1. In a machine for making fuse plugs, in combination, a rotatably mounted support for a roll of flat fuse metal, means for unwinding the roll and flattening irregularities in the fuse metal, means for feeding flat fuse metal intermittently to positions at which fuse links are to be formed, means for severing, forming, and gripping fuse links, and means for inserting a fuse link in a fuse plug.

2. In a machine for making fuse plugs, in combination, a rotatably mounted support for a roll of flat fuse metal, means for unwinding the roll and flattening irregularities in the fuse metal, means for feeding flat fuse metal intermittently to positions at which fuse links are to be formed, means for severing, forming, and gripping fuse links, means for locating a fuse plug, and means for inserting a fuse link in a fuse plug.

3. In a machine for making fuse plugs, in combination, means for feeding flat fuse metal intermittently to positions at which fuse links are to be formed comprising a movable lug over which the fuse metal is passed and a pawl intermittently engaging the metal over the lug and movable with the lug and the metal, and means for severing and forming a fuse link.

4. In a machine for making fuse plugs, in combination, means for feeding flat fuse metal intermittently to positions at which fuse links are to be formed, a gang die engageable with the metal for severing and forming a fuse link step by step and means for positioning and supporting a fuse plug thereunder.

5. In a machine for making fuse plugs, in combination, means for feeding flat fuse metal intermittently to positions at which fuse links are to be formed, a gang die engageable with the metal for severing and forming a fuse link step by step, and mechanism for gripping the fuse link.

6. In a machine for making fuse plugs, in combination, means for feeding flat fuse metal intermittently to positions at which fuse links are to be formed, a gang die engageable with the metal for severing and forming a fuse link step by step, and mechanism for gripping the fuse link, said gang die and said gripping mechanism having top parts and bottom parts cooperative in forming a fuse link.

7. In a machine for making fuse plugs, in combination, means for feeding flat fuse metal intermittently to positions at which fuse links are to be formed, means for severing, forming, and gripping a fuse link, means for locating a fuse plug comprising a pivoted arm, and means for inserting a fuse link in the fuse plug.

8. In a machine for making fuse plugs, in combination, a rotatably mounted support for a roll of flat fuse metal, means for feeding flat fuse metal intermittently to positions at which fuse links can be formed, means for severing, forming, and gripping a fuse link, and a pivoted arm for inserting the fuse link in the fuse plug.

9. In a machine for making fuse plugs, in combination, a rotatably mounted support for a roll of flat fuse metal, means for feeding flat fuse metal intermittently to positions at which links are to be formed, means for severing, forming, and gripping a fuse link, a pivoted arm for inserting the fuse link in the fuse plug, and means for releasing the gripper from the fuse link.

10. In a machine for making fuse plugs, in combination, means for feeding flat fuse metal intermittently to positions at which fuse links are to be formed, a gang die engageable with the metal for severing and forming a fuse link step by step, means for supporting a plurality of fuse plugs, and means for positioning the fuse plugs intermittently under the gang die in synchronization with the fuse-metal feed.

LEO WEISS.
LOUIS LUDWIG.